(No Model.)

E. A. PECK.
COOKING VESSEL.

No. 436,903. Patented Sept. 23, 1890.

Witnesses
Wm. F. Henning.
Louis M. F. Whitehead.

Inventor
Edward A. Peck
by Dayton Poole & Brown
Attorneys.

UNITED STATES PATENT OFFICE.

EDWARD A. PECK, OF CHICAGO, ILLINOIS.

COOKING-VESSEL.

SPECIFICATION forming part of Letters Patent No. 436,903, dated September 23, 1890.

Application filed December 24, 1889. Serial No. 334,871. (No model.)

*To all whom it may concern:*

Be it known that I, EDWARD A. PECK, of Chicago, in the county of Cook and State of Illinois, have invented certain new and useful Improvements in Cooking-Vessels; and I do hereby declare that the following is a full, clear, and exact description thereof, reference being had to the accompanying drawings and to the letters of reference marked thereon, which form a part of this specification.

This invention relates to a novel construction in vessels for domestic use, being more especially intended for cooking purposes.

It has for its object to provide a vessel in which puddings or similar articles may be made or cooked, and from which the cooked article may be withdrawn conveniently and without rupture.

In the preferred form of the invention it has the further and incidental object to make provision for the application of heat to the interior as well as to the exterior of the pudding for the purpose of cooking the latter uniformly.

Figure 1:
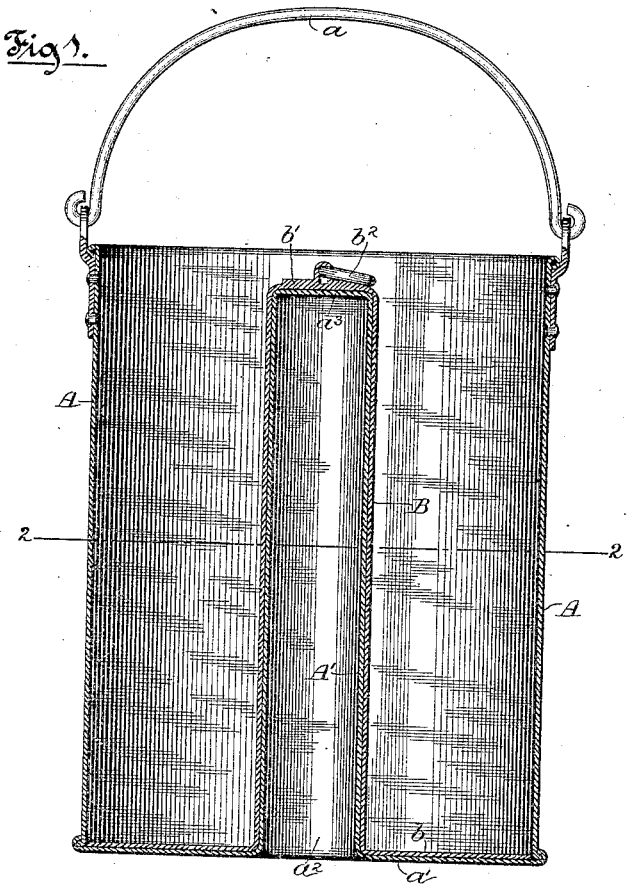
Figure 2:
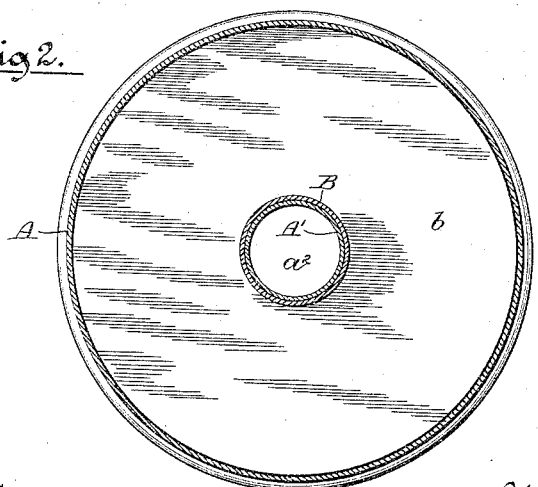

In the accompanying drawings, which illustrate my invention, Figure 1 is a central vertical section, and Fig. 2 is a horizontal section in the line 2 2 of Fig. 1.

A represents a sheet-metal vessel, which is here shown in the form of a pail, being provided with a bail or handle $a$. The bottom $a'$ of the vessel A is shown as having a central opening $a^2$, and around this opening rises a tube A′, which is secured to the bottom $a'$, and is desirably closed at the top by a cap $a^3$.

B is a tube surrounding the tube A′, and provided at its bottom with an annular plate or flange $b$, covering and resting upon the annular bottom $a'$ of the vessel A. The top of the tube B is shown closed by a cap $b'$, to which is attached a lifting-ring $b^2$.

The tube B, with its attached flange $b$, is adapted to be raised out of the vessel A by means of the lifting-ring $b^2$, and in being thus raised it is obvious that the plate $b$ will raise the solidified contents of the vessel without breaking them, because sustained from beneath by the said plate. A cooked article, like a pudding or cake, can therefore by these means be lifted from the vessel A without its being broken in the operation.

The removable structure B $b$ may remain in the cake or pudding until the latter is eaten, and with its ring $b^2$ may serve as a convenient means of lifting or handling it.

If desired, a number of the flanged tubes B may be furnished with a single vessel A, so that a number of cakes or puddings may be cooked in said vessel and removed, as described, and severally left upon the flanged tubes until consumed.

I claim as my invention—

The combination, with a vessel A, provided with the open-bottomed tube A′, of the tube B, provided with a lifting-ring at its upper end and with a flange $b$ at its lower end resting upon the bottom of the vessel A, substantially as described.

In testimony that I claim the foregoing as my invention, I affix my signature in presence of two witnesses.

EDWARD A. PECK.

Witnesses:
M. E. DAYTON,
C. CLARENCE POOLE.